United States Patent [19]

Howard

[11] Patent Number: 4,629,066
[45] Date of Patent: Dec. 16, 1986

[54] CASSETTE CARRYING CONTAINER

[75] Inventor: William A. Howard, Barrington, N.H.

[73] Assignee: Savoy Leather Manufacturing Corporation, Haverhill, Mass.

[21] Appl. No.: 713,249

[22] Filed: Mar. 18, 1985

[51] Int. Cl.$^4$ .......................... B65D 1/36; B65D 1/48
[52] U.S. Cl. ..................... 206/387; 206/425; 190/110
[58] Field of Search ............... 206/387, 425; 190/110, 190/24, 25, 127; 220/22.1

[56] References Cited

U.S. PATENT DOCUMENTS

| 55,689 | 6/1866 | McDonald | 190/24 |
| 256,578 | 4/1882 | Mantz | 190/24 |
| 3,627,113 | 12/1971 | Di Ioia | 206/387 |
| 3,674,132 | 7/1972 | Loss | 206/387 |
| 3,710,900 | 1/1973 | Fink | 206/387 |
| 4,003,468 | 1/1977 | Berkman | 206/387 |
| 4,040,518 | 8/1977 | Carter | 206/387 |

FOREIGN PATENT DOCUMENTS 8201810 6/1982 PCT Int'l Appl. ................ 220/22.1

Primary Examiner—William Price
Assistant Examiner—Brenda J. Ehrhardt
Attorney, Agent, or Firm—Charles Hieken

[57] ABSTRACT

A cassette carrying case has a rectangular bottom with a pressed cardboard bottom formed with recesses for accommodating cassettes and flocked. A top of dome shape is hinged to the rectangular bottom and carries a domed styrene plastic insert that nests in the top and is formed with a number of parallel ribs that engage the tops of the cassettes when nested in the recesses in the bottom portion with the top over the bottom.

2 Claims, 2 Drawing Figures

CASSETTE CARRYING CONTAINER

The present invention relates in general to cassette carrying and more particularly concerns novel apparatus and techniques for carrying cassettes in a neat case relatively free from rattle and maintaining an attractive appearance for a relatively long duration.

It is an important object of the invention to provide an improved cassette carrying case.

According to the invention, in a cassette carrying case having a first portion formed with recesses for accommodating individual cassettes hinged to a second portion of dome shape, the improvement resides in a styrene plastic dome portion secured to the inside of the second portion and formed with ribs adapted to engage a side of the cassettes to coact with the first portion to keep the cassettes firmly in place.

Figure 1:
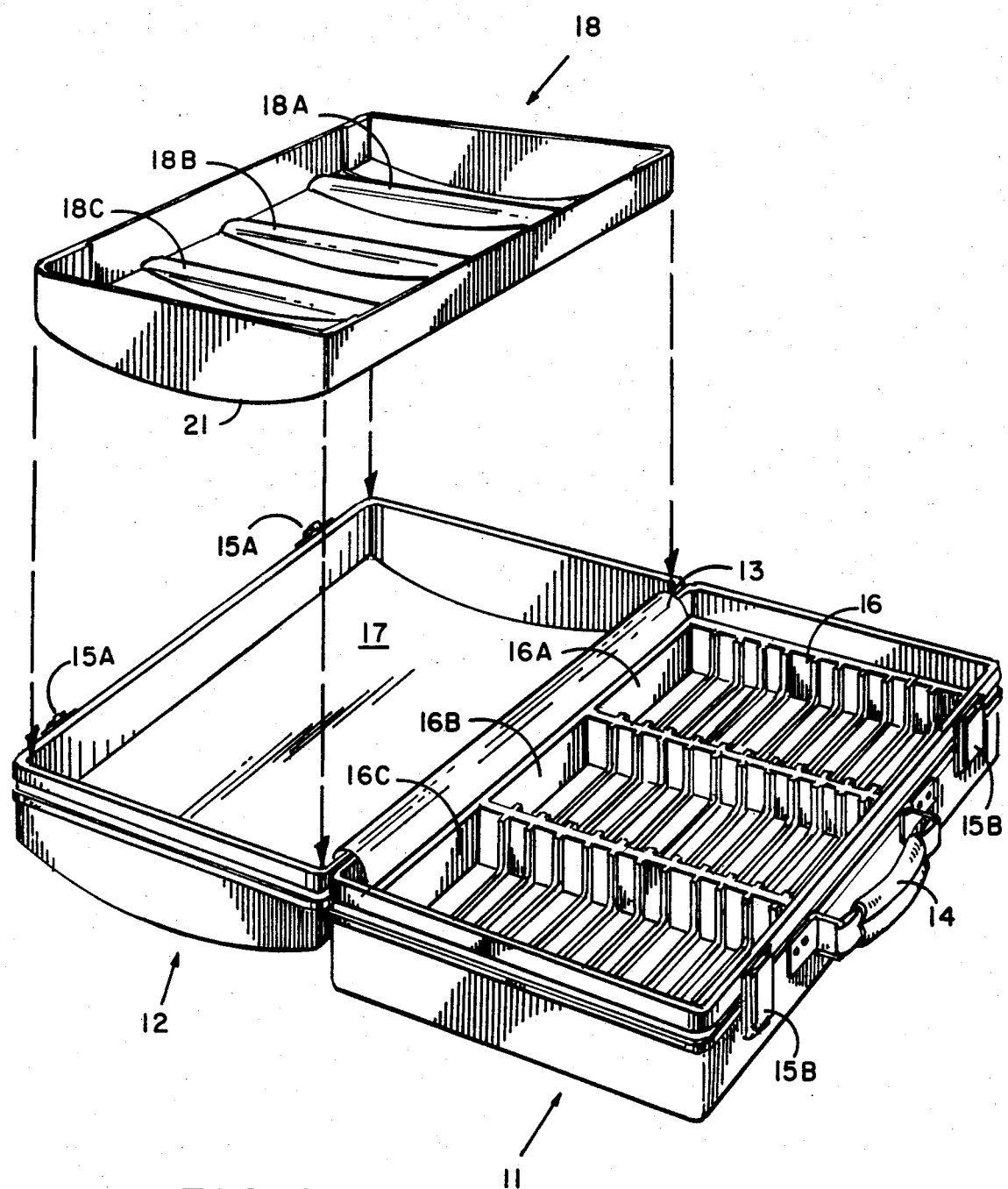
Figure 2:
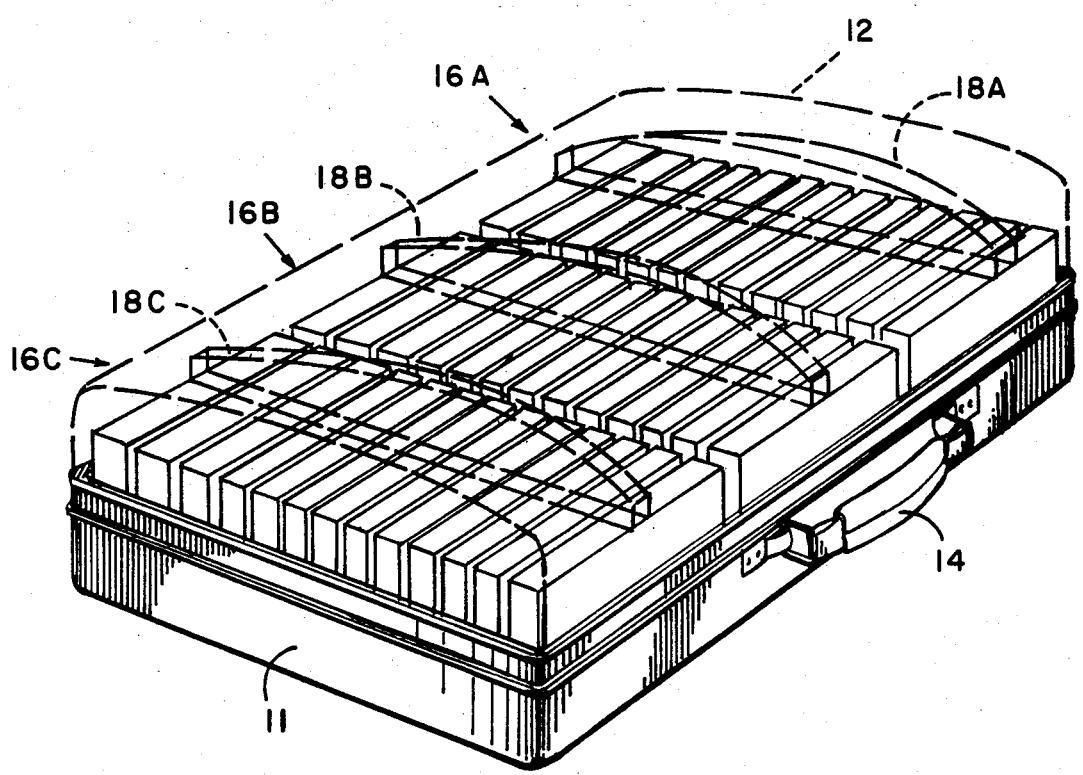

Numerous other features, objects and advantages of the invention will become apparent from the following specification when read in connection with the accompanying drawing in which:

FIG. 1 is a partially exploded perspective view of an embodiment of the invention; and FIG. 2 is a perspective view showing the top in phantom to illustrate ribs helping hold cassettes in place.

With reference now to the drawing and more particularly FIG. 1 thereof, there is shown a partially exploded perspective view of an embodiment of the invention. The cassette case has a rectangular bottom 11 hinged in conventional manner to a rectangular top 12 of dome shape and made of conventional materials, the case typically being vinyl covered with a vinyl flap 13 covering the gap between Bottom 11 includes a conventional handle 14 and clasp portions 15B engaged by portions 15A on top 12.

An insert 16 formed with recesses for accommodating cassettes is secured inside bottom 11 in conventional manner and made of conventional flocked pressed cardboard material.

Top 12 is of dome shape, its inner surface 17 being concave. Upper dome insert 18 is made of molded styrene plastic, flocked on the inside and secured to the inside of top 12 with its convex surface 21 engaging the concave surface 17. Fastening may be by adhesive, stitching, rivets, combinations thereof, or other suitable means. Styrene plastic domed insert 18 is also formed with three ribs 18A, 18B and 18C that are positioned over channels 16A, 16B and 16C of bottom insert 16 and are generally perpendicular to the axis about which rectangular bottom 11 is hinged to rectangular top 12.

Referring to FIG. 2, there is shown a perspective view of the case closed with top 12 shown in phantom to illustrate how ribs 18A, 18B and 18C snugly engage cassettes lodged in channels 16A, 16B and 16C, respectively.

The improvement of making domed insert 18 of styrene plastic results in maintenance of the dome shape essentially for the life of the case, preserving its attractive appearance. The prior art approach of using flaked cardboard resulted in the dome flattening over a period of use, rendering the case unattractive A further advantage resides in the domed styrene plastic insert 18 being formed with ribs 18A, 18B and 18C for helping keep the cassettes firmly in place.

There has been described novel apparatus and techniques for improving cassette carrying characterized by maintenance of good appearance over long periods of use while helping to keep cassettes snugly in place with structure that is relatively sturdy, inexpensive and relatively easy to assemble by relatively unskilled personnel. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. In a cassette carrying case having a first portion formed with recesses for accommodating cassettes hingeably connected to a second portion of dome shape for covering the first portion, the improvement comprising,
   a styrene plastic domed insert seated inside said second portion in mating engagement therewith.
   said styrene plastic insert being formed with a plurality of generally parallel ribs for engagement with the tops of cassettes when seated in said recesses with said second portion over said first portion,
   said ribs being generally perpendicular to the axis about which said first portion is hingeably connected to said second portion.

2. The improvement in accordance with claim 1 wherein said insert is flocked.

* * * * *